Patented Dec. 13, 1949

2,491,116

UNITED STATES PATENT OFFICE 2,491,116

FRIEDEL-CRAFTS TYPE CATALYST COMPLEXES AND THEIR PREPARATION

Charles A. Kraus, Providence, R. I., and John D. Calfee, Manhasset, N. Y., assignors to Standard Oil Development Company, a corporation of Delaware No Drawing. Original application November 16, 1943, Serial No. 510,490, now Patent No. 2,404,444, dated July 23, 1946. Divided and this application August 29, 1945, Serial No. 613,444

7 Claims. (Cl. 252—429)

1

The present invention relates to the preparation of metal halide complexes which have been found to be suitable for aiding in the effecting of organic reactions such as, for example, the isomerization of normal paraffins to isoparaffins, the alkylation of isoparaffins with monoolefins, the polymerization of monoolefins, the cracking of reduced petroleum crude oils, and the nuclear alkylation of aromatic hydrocarbons with alkyl halides, alcohols and/or monoolefins.

This is a division of Serial No. 510,490, filed November 16, 1943, now United States Letters Patent No. 2,404,444, granted July 23, 1946.

Metal halides of the Friedel-Crafts type have been used in the past to induce a number of reactions among which are those mentioned above, but particularly in the case of the aluminum halides such as aluminum chloride no completely satisfactory catalyst mass has as yet been devised. Continued usage of aluminum chloride catalysts for effecting the isomerization of normal paraffins, the polymerization of olefins, the alkylation of isoparaffins with olefins, and the like, results in a decomposition of the aluminum chloride to form liquid, highly carbonaceous substances which are less efficacious for catalyzing these reactions than the solid fresh aluminum chloride. By the liquefying and degradation of aluminum chloride or aluminum bromide in carrying out such reactions, commercial units oftentimes are required to be shut down and the reactors and catalyst beds cleaned and recharged with fresh catalyst before proceeding with the reaction. This is often expensive and troublesome because of the character of the sludges formed with the aluminum chloride. In addition, of course, the catalyst life is materially reduced due to this sludge formation and too frequently the catalyst must be replaced with fresh aluminum chloride or aluminum bromide catalyst compositions, thereby resulting in an uneconomical operation.

Attempts have been made in the past to improve aluminum chloride catalysts for use in organic reactions, particularly hydrocarbon reactions, by resorting to drastic reaction conditions and short contact times in order to minimize this sludge formation, but these expedients have not been particularly successful since appreciable cracking of the reactants occurred rather than a minimizing of the sludging tendency. Furthermore, under certain reaction conditions which are particularly conducive to catalyzing some organic reactions, such as the isomerization of the higher molecular weight straight chain paraffins, aluminum chloride has been found to be impractical even under the best conditions known, because the cracking tendency of the aluminum chloride appears to be superior to the isomerization tendency and hence aluminum chloride is not particularly suitable for this type of reaction. Furthermore, aluminum chloride and aluminum bromide have been found to be relatively short lived in their activity for the promotion of hydrocarbon isomerizations and condensations.

It is an object of the present invention to produce novel catalyst masses which remain active for catalyzing organic reactions for a far greater length of time than has heretofore been found possible using the ordinary Friedel-Crafts type metal halide catalysts. It is a further object of the invention to provide a simple and convenient method for the preparation of metal halide Friedel-Crafts type catalyst complexes which are suitable for catalyzing the heretofore-mentioned organic reactions. Another object of the invention is to provide a catalyst mass comprising aluminum halide complexes which are economical to produce and have excellent catalyst life when used to catalyze the heretofore-mentioned organic reactions. A further object of the invention is to prepare aluminum halide-lower alkoxy metal halide reaction products of porous structure for use in catalyzing organic reactions, said complexes being relatively stable and maintaining catalytic activity over long periods of time. Other objects of the invention will become apparent upon a fuller understanding of the invention to be hereinafter more fully described.

The novel catalyst complexes of the present invention are prepared in a number of ways. One method of preparing these catalysts resides in the use of lower alkoxy metal halides or lower trialkoxy metal halides being contacted and admixed with a Friedel-Crafts type catalyst of the metal halide type, followed by heat fusing of the resultant admixture to a temperature sufficiently high to completely fuse the mass. Following fusion, the mass is kept at an elevated temperature of between about 80° C. and about 200° C. until the liquid is converted into a dry solid material and evolution of alkyl halide is essentially complete. A catalyst so prepared has been found to have the desired catalytic activities. A preferred method of preparing the catalyst mass, however, involves not only the heat fusing of the resultant admixture but a further heating to a slightly higher temperature for a length of time to allow for the removal by vaporization of any uncombined or free metal halide contained in the catalyst mass. The removal of the free halide may be accelerated by conducting the sublimation under reduced pressure. This method resulted in a catalyst complex which had even better catalytic activity than the first method of preparation. Still a third method of preparing the catalyst mass resides in the preparation of the metal halide alcohol addition complex in the presence of excess amounts of a Friedel-Crafts type metal halide, followed by heat fusion, formation of the alkoxy halide by splitting out hydrogen chloride, subsequent formation of active catalyst through elimination of the alkyl halide, and the removal of excess Friedel-Crafts type metal halide by heat. Such a method, for example, would involve the reaction of methyl alcohol in the amount of 1 mol with more than 1 mol of aluminum chloride. The preparation of aluminum methoxy halides may be carried out in an anhydrous carbon disulfide medium by adding alcohol to a refluxing mixture of carbon disulfide and the metal halide. The resultant aluminum methoxy compound may then be separated from the solvent and heated at a temperature of 80° C.–200° C. in the presence of excess aluminum chloride to form a compound having an empirical formula of $AlCl_2OCH_3.4AlOCl$.

Methoxy aluminum chloride may be mixed with aluminum bromide and the active catalyst formed by fusing the mixture and then maintaining it at a sufficiently elevated temperature to cause essentially four-fifths of the methyl groups to be evolved as the methyl halide. The empirical composition of the catalyst following removal of all free aluminum halide is $AlX_2OCH_3.AlOX$ where X may be chlorine or bromine, or both chlorine and bromine in the same molecule. A further example of a particular catalyst prepared in accordance with the process of the present invention involved the reaction of $AlCl_2OCH_3$ with $SbCl_3$ to give the thermal decomposition product of aluminum methoxy chloride chemically combined in part, at least, with an antimony halide, the antimony content falling between 0.1% by weight of the aluminum compound and that required for the compound $AlCl_2OCH_3.4SbOCl$, depending upon the experimental conditions. It is believed, based on experimental determinations, that the empirical formula, $AlCl_2OCH_3.4AlOCl$, represents a close approximation of the true composition of the type of compounds produced but the invention should be understood as not being limited thereto but as being directed to the compounds produced by the reaction of Friedel-Crafts type metal halides with lower alkyl monohydric alcohols or with the lower alkoxy derivatives of metal halides in accordance with the methods herein outlined. In general, the admixtures of the reactants heretofore mentioned are heated at least to the fusion point and preferably they are heated to a temperature between about 80° C. and about 200° C. for a period of time sufficient to insure completion of the reaction giving rise to the evolution of the alkyl halide. The unreacted metal halide is removed by sublimation upon continued heating, preferably under reduced pressure. As will be seen from the data hereinafter set forth, active catalysts are produced by the decomposition of the metallic alkoxy halide in the presence of free metallic halide and that it is preferable to remove any free or uncombined Friedel-Crafts type metal halide that may be contained therein. The Friedel-Crafts type metal halide may be employed in a substantial molar excess of the amount of lower alkyl monohydric alcohol or lower alkoxy metal halide used, but in such a case it is preferable to remove the excess or uncombined metal halide from the final catalyst complex prior to using the same for catalyzing the heretofore-mentioned organic reactions.

The resultant catalyst complexes appear as a porous, brittle mass, white to light yellow in color. They are non-volatile under the elevated temperatures customarily employed. If desired, the catalyst complexes may be prepared on a carrier such as activated alumina, partially dehydrated bauxite, activated carbon, silica gel, alumina gel and the like. Such a process involves the impregnation of the carrier mass with vapors of aluminum chloride or aluminum bromide or other suitable Friedel-Crafts type catalyst, followed by contacting of the impregnated mass with methyl or ethyl alcohol vapors or some other suitable lower alkyl monohydric alcohol into the carrier mass so impregnated. This mass is then gradually heated to a temperature between about 40° C. and 200° C., thereby forming the novel catalyst complexes within the carrier selected. A stream of superheated inert vapor such as hydrogen, nitrogen, carbon dioxide and the like, may be passed through the carrier mass maintained at the desired temperature so that the mass is thereby freed of any free or uncombined metal halide contained therein.

An excellent method for preparing the catalyst on a suitable support consists of mixing the aluminum methoxide with the aluminum halide, fusing, and before evolution of the alkyl halide commences, soaking the inert carrier in the melt. The carrier may then be removed and the decomposition to form the catalyst conducted at the proper temperature.

The catalysts so formed have been found to be particularly effective in catalyzing the isomerization of normal paraffins to isoparaffins as will be more fully hereinafter described. Although, as has been stated heretofore, it is preferred to use the novel catalyst complexes substantially free of uncombined Friedel-Crafts type metal halide, and, as has previously been stated, some free and uncombined Friedel-Crafts type metal halide catalyst may remain in admixture with the final catalyst complex, it is within the contemplation of the present inventoin to add further amounts of Friedel-Crafts type catalyst to the resultant catalyst mass and to employ such admixtures as catalysts where the activity of the final catalyst composition demands that a more active catalyst be employed. In general, the novel catalyst complexes herein described may be prepared by admixing a compound having the formula

with from one to six mols of a metal halide having the formula

wherein R represents a lower alkyl group, preferably methyl or ethyl, M and M' in at least one of the compounds represents a metal whose halide is a Friedel-Crafts type catalyst (M and M' may be the same or a different metal), X represents a halogen such as, for example, chlorine or bromine, y is an integer, 1, 2 or 3, while z represents 3—y, and n represents an integer of 6 or less. Specific compounds contemplated as the initial reactant in preparing the novel catalyst complexes are as follows:

AlCl₂OCH₃          AlBr₂OC₂H₅
AlBr₂OCH₃          Al(OCH₃)₃
AlClBrOCH₃         Al(OC₂H₅)₃
AlCl(OCH₃)₂        SbCl₂OCH₃
AlBr(OCH₃)₂        SbBr₂OCH₃
AlCl₂OC₂H₅         Sb(OCH₃)₃ and the like.

Compounds representative of the class MX$_n$ which may be employed in accordance with the process of the present invention are those customarily identified as the Friedel-Crafts type metal halides. These are, for example, AlCl₃              SnCl₄
AlBr₃              TiCl₄
AlClBr₂            ZrCl₄
AlCl₂Br            UCl₄
SbCl₃              AsCl₃
ZnCl₂ and the like.

As previously pointed out, still a further modification involves the reaction of a lower alkyl monohydric alcohol such as methyl alcohol, ethyl alcohol, n-propyl alcohol, isopropyl alcohol, etc., with two or more mols of one of the hereinmentioned Friedel-Crafts type metal halides. The resulting compounds are thought to have the following empirical formula, although there is no intention to limit the invention to this formula since at best it constitutes merely an empirical formula based upon analytical data. The formula is believed to be as follows:

MX₂OR.4M'OX wherein the characters have the same designation as previously stated.

The following examples, the data of which are presented in the accompanying table, are illustrative of the character of the invention. It is not intended, however, that the invention be limited thereto.

Runs Nos. 1 and 10 reported on lines 1 and 10 of the table are inserted merely for comparative purposes. These catalysts were CP grade of aluminum chloride and aluminum bromide, respectively. The decomposition temperature stated is that temperature to which the reaction mass was heated in order to eliminate the alkyl halide as formed in the process of reaction. The resultant catalyst in each instance, in the amount indicated in grams, was contacted at room temperature, under an atmosphere of dry hydrogen chloride, with liquid normal heptane in the amount indicated and the admixture agitated for the specified number of hours. The liquid was then separated from the solid catalyst complex and distilled in a distillation column packed with a glass spiral wrapped on a solid glass rod. The fractionating power of the column used was considered to be equivalent to about 7 theoretical plates. The distillate was measured by volume and on fractionation the distillate was collected in a graduated receiver. The percentage of product boiling between 80° C. and 93° C. was a measure of the amount of the branched chain heptanes produced in the isomerization reaction. The catalyst mixture in Run No. 4, although being heated at 150° C., was heated for a sufficient length of time to decompose the mass but not to remove from the mixture the free metal halide contained therein. The catalyst was prepared at 150° C. and then cooled immediately to room temperature.

Table

| Catalyst preparation | | | Isomerization of N-heptane at room temperature in atmosphere of dry HCl | | | |
|---|---|---|---|---|---|---|
| Reactants Employed in Preparing Catalyst, Molar Ratios | Decomposition Temperature, °C. | Free Metal Halide Removed | Catalyst, Grams | N-heptane, c. c. | Agitation and Reaction Contact Time Hours | Distillate, 80–93° C., Vol. Per cent |
| AlCl₃ | | | 10 | 29.0 | 17 | 11.5 |
| AlBr₂OCH₃+AlBr₃ | 160 | No | 8 | 22.0 | 2.5 | 5.5 |
| AlCl₂OCH₃+AlBr₃ | 160 | No | 6 | 29.0 | 2.5 | 5.5 |
| Al(OC₂H₅)₃+4AlCl₃ | (Fused) 150 | No | 5 | 20 | 7.5 | 7.0 |
| 3CH₃OH+3AlCl₃+AlBr₃ | 110 | No | 10 | 30 | 18 | 14.0 |
| Al(OCH₃)₃+3AlBr₃ | 200 | Yes | 5 | 20 | 7 | 21.0 |
| AlCl₂OCH₃+SbCl₃ | 180 | Yes | 7.1 | 20 | 8 | 22.5 |
| AlCl₂OCH₃+SbBr₃ | 180 | Yes | 5 | 20 | 19 | 31.0 |
| AlBr₂OCH₃+AlBr₃ | 160 | Yes | 5 | 15 | 2.5 | 34.5 |
| AlBr₃ | | | 22 | 18 | 2 | 10.0 |
| AlCl₂OCH₃+AlBr₃ | 160 | Yes | 7 | 30 | 18 | 35.0 |
| CH₃OH+2AlBr₃ | 180 | Yes | 6.8 | 30 | 18 | 41.5 |

Having now fully described and illustrated the character of the invention, what is desired to be secured by Letters Patent is:

1. A process for preparing a metallo-organic halide complex useful for promoting organic reactions which comprises condensing 1 mol of an alkoxy metal halide with from 1 to 4 mols of a metal halide at a temperature of 80° C. to 200° C., the halides of the metal constituents in these condensation reactants being Friedel-Crafts type catalysts and the alkoxy groups in said alkoxy metal halide containing 1 to 3 carbon atoms in each of their alkyl radicals, removing alkyl halide vapor evolved from the resulting condensation reaction mixture which is maintained as a fused mass at a temperature between 80° C. and 200° C. until a solid condensation product is obtained, said solid condensation product being a complex of said alkoxy metal halide combined with an oxy halide of the metal constituent in said metal halide.

2. The process as described in claim 1, in which an excess of said metal halide is present with the solid condensation product.

3. The process as described in claim 1, in which said alkoxy metal halide is methoxy aluminum chloride.

4. A new composition of matter useful in promoting isomerization reactions and having a solid porous structure consisting of a condensation product of an alkoxy derivative of a metal halide of the Friedel-Crafts type with an excess of a metal halide of the Friedel-Crafts type, said condensation product being fused until it is a dry solid and free of excess metal halide, whereby there is obtained a product of the empirical formula:

$$M(X)_{n-1}OR \cdot m(MOX)$$

wherein M represents a metal whose halide is a Friedel-Crafts type catalyst; X is a halogen selected from the group consisting of chlorine and bromine; n is an integer representing the valence of M; O is oxygen; R is an alkyl radical containing from 1 to 3 carbon atoms; and m is a value from 1 to 4.

5. A new composition of matter useful in promoting isomerization reactions and having a solid, porous structure consisting of a condensation product of an alkoxy derivative of an aluminum halide with an excess of a metal halide of the Friedel-Crafts type, said condensation product being fused until it is a dry solid and free of excess metal halide, whereby there is obtained a product of the empirical formula:

$$Al(X)_2OR \cdot (MOX)$$

wherein X is a halide of the class consisting of chlorine and bromine; O represents oxygen; R is an alkyl radical containing from 1 to 3 carbon atoms and M is a metal whose halide is a Friedel-Crafts catalyst.

6. A new composition of matter useful in promoting isomerization reactions and having a solid porous structure consisting of a condensation product of an alkoxy aluminum chloride with an excess of aluminum chloride, said condensation product being fused until it is a dry solid and free of excess metal halide, whereby there is obtained a product having the empirical formula:

$$AlCl_2OR \cdot 4AlOCl$$

wherein R is an alkyl radical containing from 1 to 3 carbon atoms.

7. A product as defined in claim 6 wherein R represents a methyl radical.

CHARLES A. KRAUS.
JOHN D. CALFEE.

REFERENCES CITED

The following references are of record in the file of this patent:

UNITED STATES PATENTS

| Number | Name | Date |
|---|---|---|
| 1,793,935 | Kaufter et al. | Feb. 24, 1931 |
| 2,052,889 | Loder et al. | Sept. 1, 1936 |
| 2,125,961 | Shoemaker et al. | Aug. 9, 1938 |
| 2,270,292 | Grasse | Jan. 20, 1942 |

OTHER REFERENCES

Child et al.: "J. A. C. S.," vol. 47, pp. 798–807 (1925).

Betsi: "Academy of Athens," record of proceedings, vol. 6, pp. 148–153 (1931).

Funk et al.: "Zert. Anorg. Allgem. Chem.," vol. 205, pp. 361–368 (1932).

Norris et al.: "J. A. C. S.," vol. 61, pp. 1413–1417 (1939).